(12) United States Patent
Fujihira et al.

(10) Patent No.: US 7,507,957 B2
(45) Date of Patent: Mar. 24, 2009

(54) PROBE MICROSCOPE SYSTEM SUITABLE FOR OBSERVING SAMPLE OF LONG BODY

(75) Inventors: Masamichi Fujihira, Tokyo (JP); Masatoshi Yasutake, Chiba (JP); Tatsuaki Ataka, Chiba (JP)

(73) Assignee: SII NanoTechnology Inc. (JP)

( * ) Notice: Subject to any disclaimer, the term of this patent is extended or adjusted under 35 U.S.C. 154(b) by 185 days.

(21) Appl. No.: 11/216,389

(22) Filed: Aug. 31, 2005

(65) Prior Publication Data
US 2006/0060778 A1    Mar. 23, 2006

(30) Foreign Application Priority Data
Sep. 3, 2004    (JP) .............................. 2004-256853

(51) Int. Cl.
*G01N 23/00*   (2006.01)
(52) U.S. Cl. .................. 250/306; 250/442.11; 977/853; 977/860; 977/862; 977/869; 977/871
(58) Field of Classification Search ...... 250/306–443.1; 977/853, 860, 862, 869, 871
See application file for complete search history.

(56) References Cited
U.S. PATENT DOCUMENTS

| | | | | |
|---|---|---|---|---|
| 4,999,495 A | * | 3/1991 | Miyata et al. ............... | 250/306 |
| 5,650,614 A | * | 7/1997 | Yasutake et al. ............ | 250/234 |
| 6,590,703 B2 | * | 7/2003 | Park et al. ................... | 359/372 |
| 7,260,980 B2 | * | 8/2007 | Adams et al. .............. | 73/31.05 |

* cited by examiner

*Primary Examiner*—Jack I Berman
*Assistant Examiner*—Andrew Smyth
(74) *Attorney, Agent, or Firm*—Adams & Wilks

(57) ABSTRACT

A problem to be resolved by the invention resides in providing a multifunction analyzing apparatus for detecting a shape with high resolution and physical property information capable of not only successively reading a base arrangement from end to end but also specifying a position hybridized by known RNA with regard to a single piece of DNA elongated in one direction on a board. A microscope system of the invention is provided with a fluorescence microscope, a scanning near field microscope and a scanning probe microscope as a detecting system, the microscopes are fixed to a switching mechanism and can be moved to a position at which the various microscopes can observe the same portion of a sample by switching operation of the mechanism. The microscope system of the invention is provided with a function capable of directly detecting a shape and physical property information of one piece of DNA by the scanning probe microscope by multifunction scanning.

8 Claims, 11 Drawing Sheets

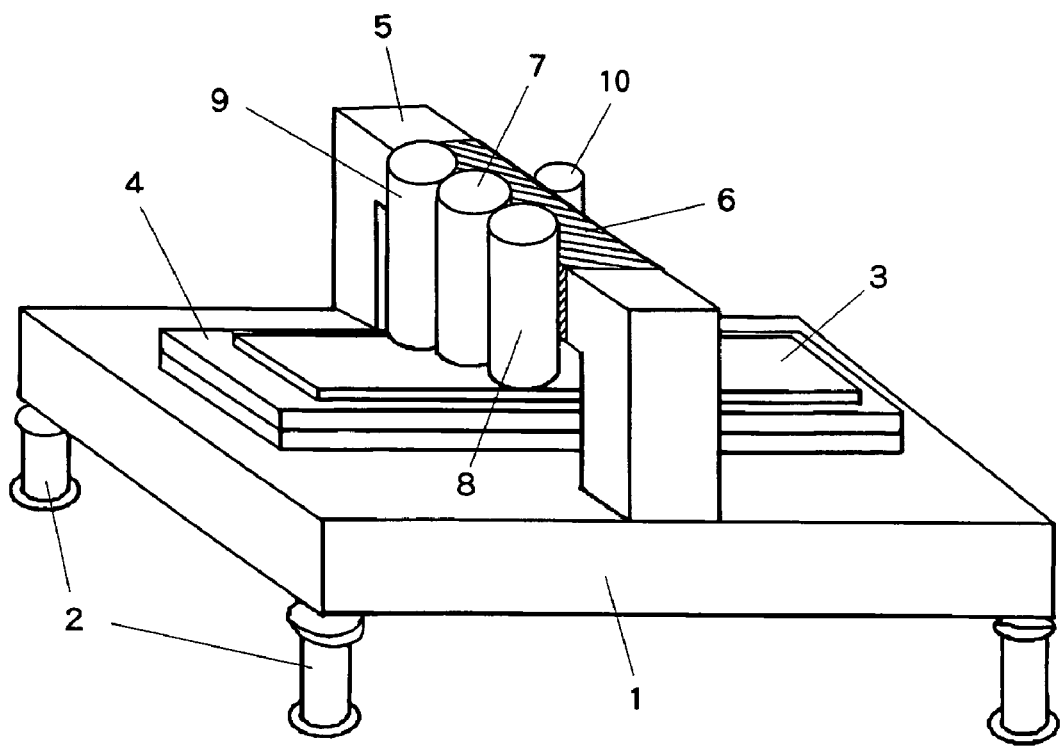
Fig.1-A
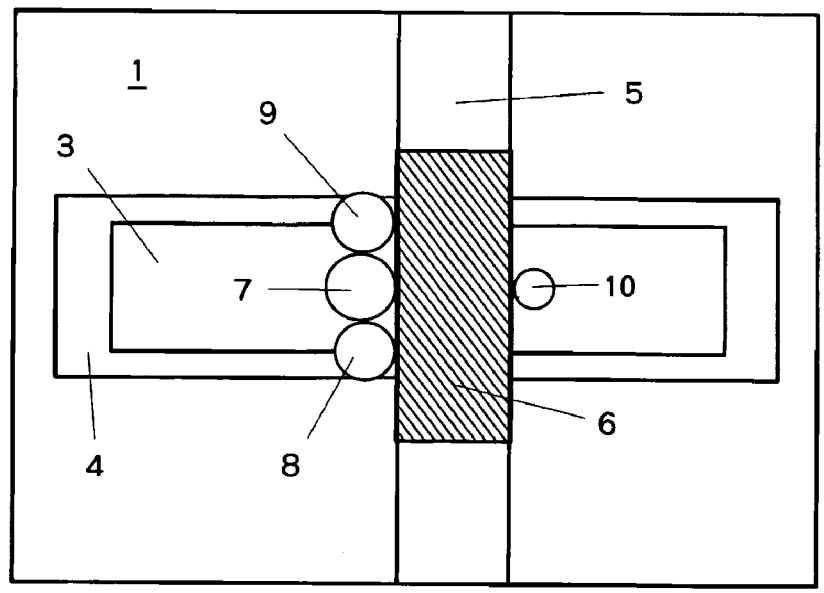
Fig.1-B

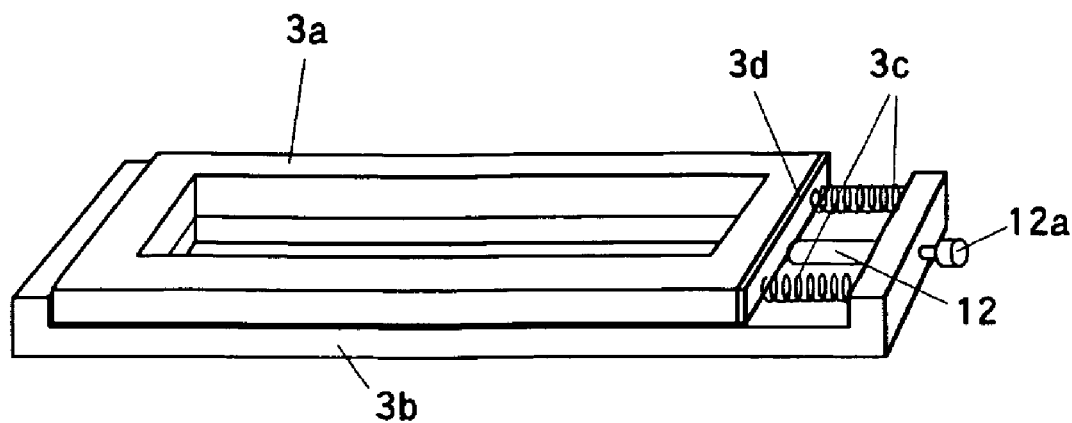
Fig.3 - A
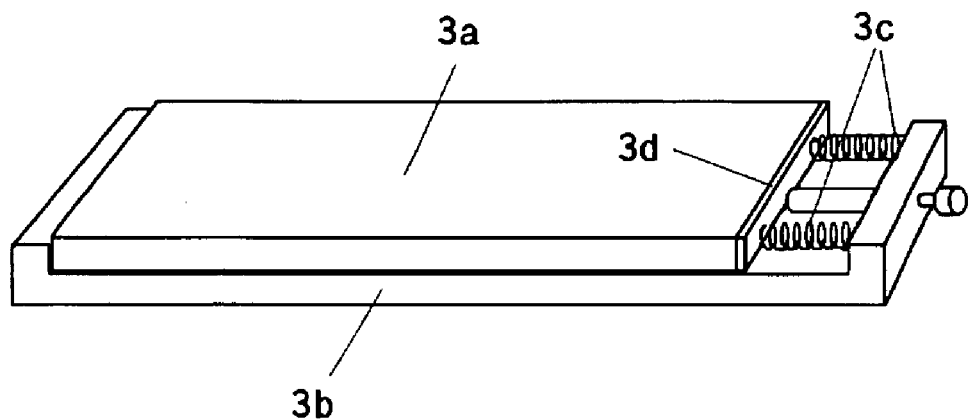
Fig.3 - B
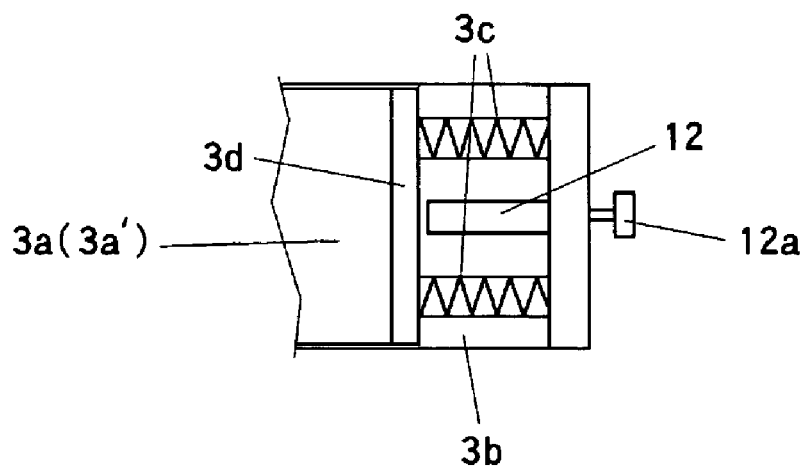
Fig.3 - C

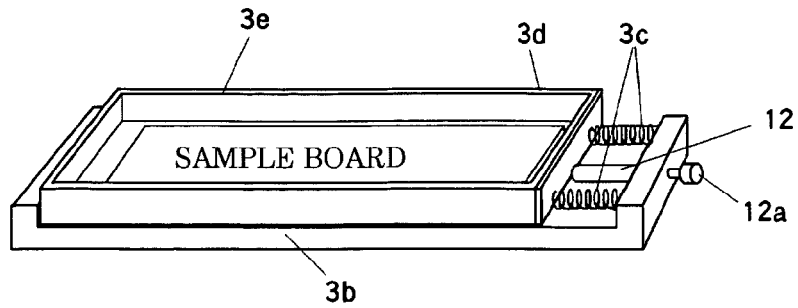
Fig.4 - A
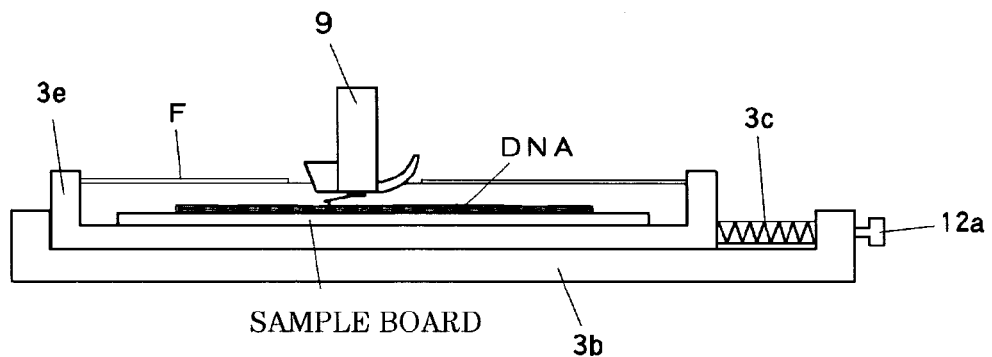
Fig.4 - B
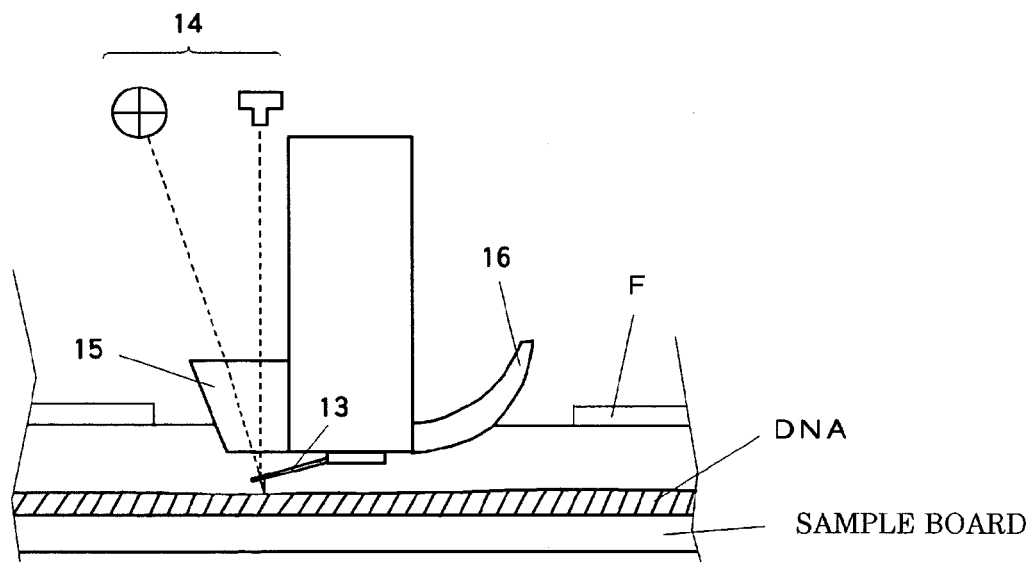
Fig.4 - C

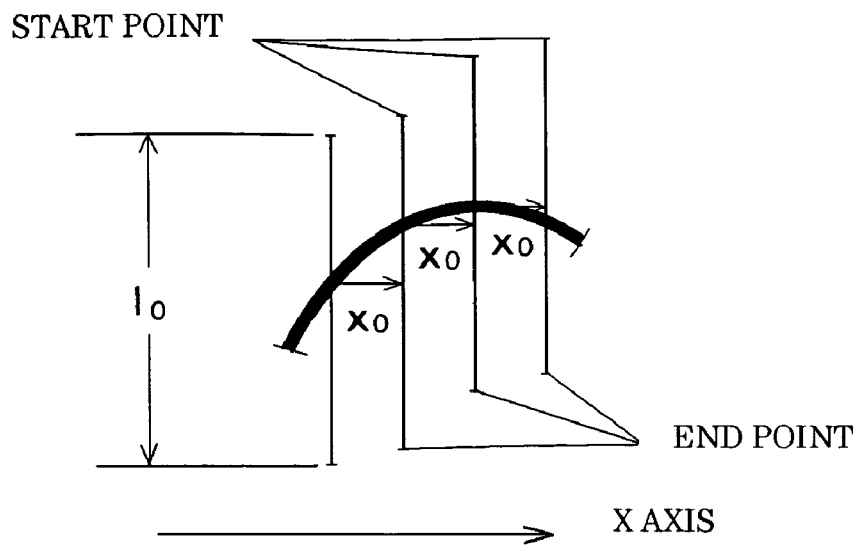
Fig.6 - A
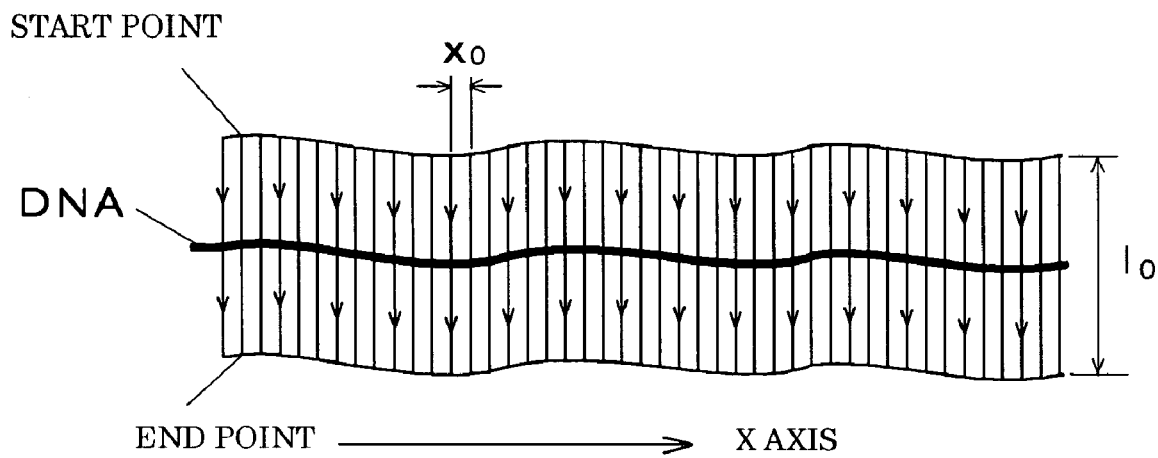
Fig.6 - B

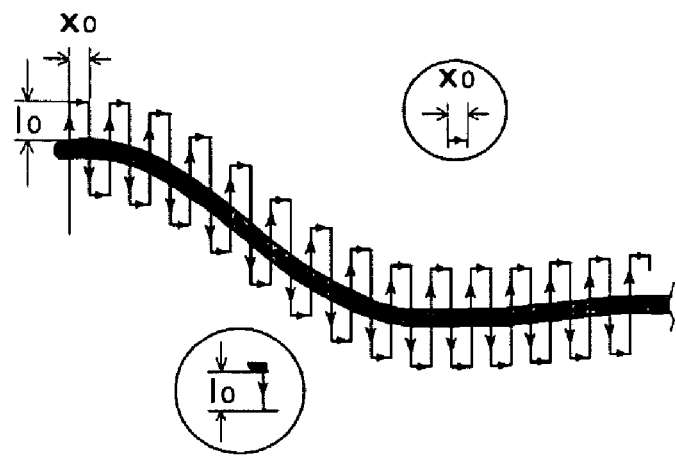
Fig.8 - A
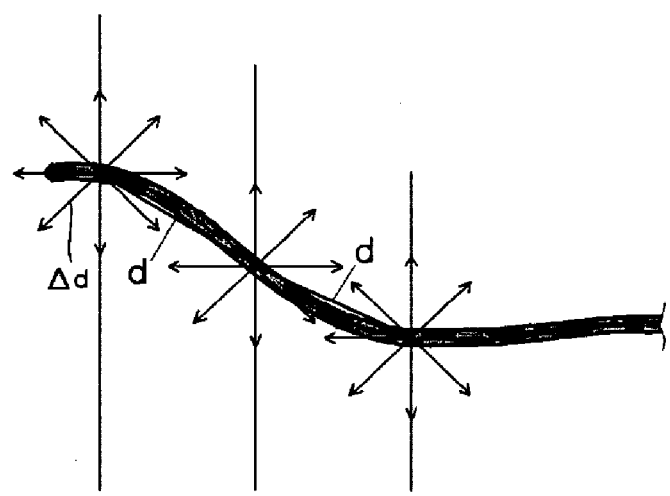
Fig.8 - B

PROBE MICROSCOPE SYSTEM SUITABLE FOR OBSERVING SAMPLE OF LONG BODY

BACKGROUND OR THE INVENTION

1. Field of the Invention

The present invention relates to a scanning probe microscope suitable for observing a sample of a long body elongated to be long on a board, particularly relates to a scanning probe microscope (SPM) technology capable of reading information of a single piece of DNA without modification.

2. Description of Related Art

In present age, DNA arrangement analysis becomes a technology which is extremely important in biological researches and medical diagnoses. DNA forms two pieces of chains in a spiral shape based on base pairs of A-T, G-C, and when heated, two pieces of chains are disentangled to constitute one piece chain. The basis of DNA arrangement analysis is constituted by retaining a state of the single piece of chain by rapidly cooling the single piece chain DNA and successively reading information inscribed to the single piece chain DNA.

Further, it is known that when the single piece chain DNA which has been constituted by being heated is gradually cooled, an original pair of the single piece chains DNA is combined to recover to the two pieces chain DNA. The phenomenon is referred to as hybridization and the term is used also for the phenomenon in which ribonucleic acid (RNA) having gene information is combined with a single piece of chain DNA at pairing arrangement positions. Medical or biological diagnoses are carried out by inspecting whether RNA to which attention is paid differs in a standard position with regard to DNA a standard arrangement of which has already been known.

Now, although in such analysis, it is requested to read DNA information from an end thereof, at present, there has not been developed a technology of forming a sample in a state in which a single piece of long DNA is elongated from end to end and successively reading information inscribed thereto from the end. In a DNA sequencer of the related art, information of single piece chain DNA is provided by an enormously troublesome operation of cutting two pieces of chains of DNA constituting a chromosome to a specific length hierarchically by using a restriction enzyme, modifying a fluorescent substance at an end thereof, reading information of individual cut DNA, ascribing DNA which has been continuous in an original single piece chain from information of the end portion, and resynthesizing hierarchical cutting. Although the operation has been carried out by a large-scaled computer, enormous time is taken and further, resynthesis is frequently failed.

Under such a situation, Patent Reference 1 has been provided with an object of providing a gene arrangement reading apparatus capable of directly reading respective code arrangement of four bases of A (adenine), C (cytosine) , G (guanine), or U (uracil) or T (thymine) of a single piece chain of RNA or DNA. According to the technology, in order to detect a specific one base of A, C, G or U or T, by bonding a base having gene information to a tip portion of a metal stylus via an adhesive binder of nanometer order having a strong bonding affinity with an organic function group such as a carbon nanotube at the tip portion of the metal stylus of a scanning probe microscope (SPM), an attraction force produced by a hydrogen bond utilizing complimentarity particular to the base is detected.

Although Patent Reference 1 explains that base arrangement information can be read by the above-described constitution with regard to the hierarchically cut DNA, an explanation has not been given of how riobonucleic acid constituting a sample is linearly fixed onto a board such that the stylus (hereinafter, described as probe for simplification) of the scanning microscope can trace, further, of a method of firmly tracking the elongated single piece chain of RNA or DNA by a probe.

The inventors have started to develop a general apparatus of detecting a number of kinds of information with regard to an elongated single piece DNA in view of establishing a prospect of a pretreatment technology of a sample in which long DNA is fixed in a state of being elongated in one direction by a method of constituting a single piece chain DNA which is normally in a state of two pieces of chains in an aqueous solution, hybridizing the single piece DNA by known RNA, DNA or polypeptide nucleic acid (PNA), labeling by fluorescence or metal colloid, and thereafter temporarily sinking and pulling up a board by traversing a gas/liquid interface of the aqueous solution of DNA.

[Patent Reference 1] JP-A-2002-350435 "Apparatus of reading gene arrangement", publication date: Dec. 4, 2002

SUMMARY OF THE INVENTION

A problem to be resolved by the invention resides in providing a scanning probe microscope constituting an object thereof by a sample of a long body and capable of detecting an image thereof in a longitudinal direction as continuous information, particularly in providing a multifunction analyzing apparatus capable of detecting a shape with a high resolution and physical property information with regard to a single piece of DNA sample elongated in one direction on a board and capable of not only successively reading a base arrangement from an end to an end thereof but also specifying a position of the sample hybridized with known RNA.

Another object of the invention resides in providing a positioning method capable of establishing a positional correspondence between respective images when switched to different microscopes.

Another object of the invention resides in providing a method by which a probe for detecting a shape and physical property information with a high resolution can detect information of a single piece of DNA regardless of a nonlinear shape thereof.

A further object of the invention resides in providing a simple and method of providing information of a single piece of DNA by connecting together information of DNA for respective scanning ranges of a probe.

Another object of the invention resides in providing a method without trouble in scanning a sample in a liquid by a probe in an apparatus adopting a sample base capable of storing the liquid.

A microscope system of the invention is provided with a fluorescence microscope (FOM), a scanning near field microscope (SNOM), and a scanning probe microscope (SPM) as a detecting system, the microscopes are fixed to a switching mechanism, and the respective microscopes are made to be able to move to positions capable of observing the same portion of a sample by switching operation of the mechanism. Further, the fluorescence microscope is an optical microscope for detecting fluorescence on a surface of a sample by irradiating an exciting beam to a sample face, and the scanning near field microscope is a microscope for scanning a sample face by making a fiber probe constituting an optical path proximate to a distance equal to or smaller than laser wavelength and synthesizing an optical image by mapping.

The microscope system of the invention is provided with a function capable of directly detecting a shape and physical property information of a single piece of DNA by the scanning probe microscope by multifunction scanning.

The microscope system of the invention is provided with a function for providing an image using a standard pattern sample by switching respective microscopes, detecting beforehand to store a corresponding relationship of positions among respective microscope images, and adjusting errors among the respective probes by an XY stage in switching.

In a gene reading apparatus of the invention, there is adopted a method of successively changing a probe scanning position for automatically measuring long and bent DNA. Specifically, there is provided a method of first, scanning a probe in a direction of traversing DNA (Y line), detecting and recording a position of DNA on Y line, successively moving the probe by one unit in X direction, and executing successive scanning by controlling positions of a start point and an end point of Y line such that a position of DNA measured at a preceding time is disposed at a center of Y line to repeat the operation thereafter.

Further, a probe is scanned in Y line by a large amount, detects to record a position (start point) of traversing DNA, thereafter, jumps by a predetermined distance in X direction, scans again Y line by a large amount, and detects to record a position (end point) of traversing DNA on Y line. There is provided a method of regarding DNA in the above-described operation as a quasilinear line, connecting the start point and the end point by a linear line, determining a number of scanning in X direction in consideration of an amount of bending of DNA in parallel with the line and scanning the probe in X direction.

Or, there is provided a method of a tracking system for controlling a position of a stylus such that a height thereof always becomes a highest position in comparison with that of a surrounding thereof and automatically tracking to scan DNA by connecting the highest positions.

There is adopted a method of providing an SPM image while feeding the microscope system, the sample stage of the invention in X direction frame by frame, feeding frames such that an overlapped portion of DNA is produced between contiguous images, and successively connecting a single piece of long DNA information by overlapping the portion.

According to the microscope system of the invention, an optical axis of an optical lever is made to pass through a fixed material of glass or the like such that an optical axis of an optical system for detecting a displacement of a cantilever is not changed even when a height of a water face is changed by scanning when an object thereof is constituted by a sample in water. Further, a probe portion is provided with a wave damper such that a liquid face does not become wavy even when a scanner of SPM is scanned at high speed.

The microscope system of the invention is provided with FOM, SNOM and SPM as the detecting system, the microscopes are fixed to the switching mechanism, the respective microscopes are made to be able to move to positions capable of observing the same portion of the sample by the switching operation of the mechanism and therefore, by successively switching FOM, SNOM and SPM, first, a position of DNA is confirmed by FOM, successively, a position to which a probe of SPM is to be carried is ascribed in DNA by SNOM, and detection of a shape with high accuracy and detection of physical property information of DNA by SPM can smoothly be started.

Further, the microscope system of the invention is provided with a function capable of directly detecting a shape and physical property information of a single piece of DNA by the scanning probe microscope by multifunction scanning and therefore, when the microscope system is functioned by a probe of a chemical force microscope, a base arrangement of a single piece of long DNA can be read from an end thereof, and measurement of a shape by a Topography image, measurement of a shape of DNA by a phase image, measurement of adsorbing force of DNA by PFM (Pulse Force Mode), and measurement of a potential by KFM (Kelvin Probe Force Mode) can be carried out.

Further, the microscope system of the invention is provided with a function of providing an image using a standard pattern sample by switching respective microscopes, detecting beforehand to store a corresponding relationship of positions in respective microscope images, and adjusting errors among respective probes by an XY stage in switching and therefore, even when there is a mechanical deviation in the switching mechanism, a positional shift can be resolved by controlling the XY stage.

The microscope system of the invention adopts a method of successively changing a probe scanning position while confirming the position in order to measure long bent DNA by an automatic tracking system, or scanning DNA by providing a tracking function to always advance on DNA and therefore, the probe can execute desired detection by firmly catching a single piece of DNA in a long nonlinear shape.

Further, the microscope system of the invention adopts a method of providing an SPM image while feeding a sample stage in X direction frame by frame, feeding frames such that an overlapped portion of DNA is produced between contiguous images, and successively connecting a single piece of long DNA information by overlapping the portion and therefore, a single piece of long DNA information can easily and firmly be synthesized by successively acquiring the image from the end and matching the overlapped portion without cutting DNA having a length far exceeding a scanning region of SPM into pieces as in the related art.

Further, according to the microscope system of the invention, in a case of examining an object of a sample in water, even when a height of a water face is changed by scanning an optical axis of an optical lever is made to pass through a fixed material of glass or the like such that an optical axis of an optical system for detecting a displacement of a cantilever is not changed, a probe portion is provided with a wave damper such that a liquid face does not become wavy even when a scanner of SPM is scanned at high speed and therefore, test and inspection can be carried out as in the atmosphere by removing an adverse influence by a presence of a liquid even when the sample is placed in the liquid.

BRIEF DESCRIPTION OF THE DRAWINGS

FIGS. 1A and 1B are views showing a basic constitution of a microscope system according to the invention;

FIGS. 3A, 3B and 3C are views for explaining a sample base used in the atmosphere used in the microscope system according to the invention;

FIGS. 4A, 4B and 4C are views for explaining a sample base in a liquid and a special structure of SPM for a sample in a liquid used in the microscope system according to the invention;

FIGS. 6A and 6B are views for explaining a first method of scanning a probe according to the invention;

FIG. 8A is a view for explaining a third method of scanning a probe according to the invention, and FIG. 8B is a view for explaining a fourth method of scanning a probe according to the invention;

DESCRIPTION OF PREFERRED EMBODIMENTS

Figure 2:
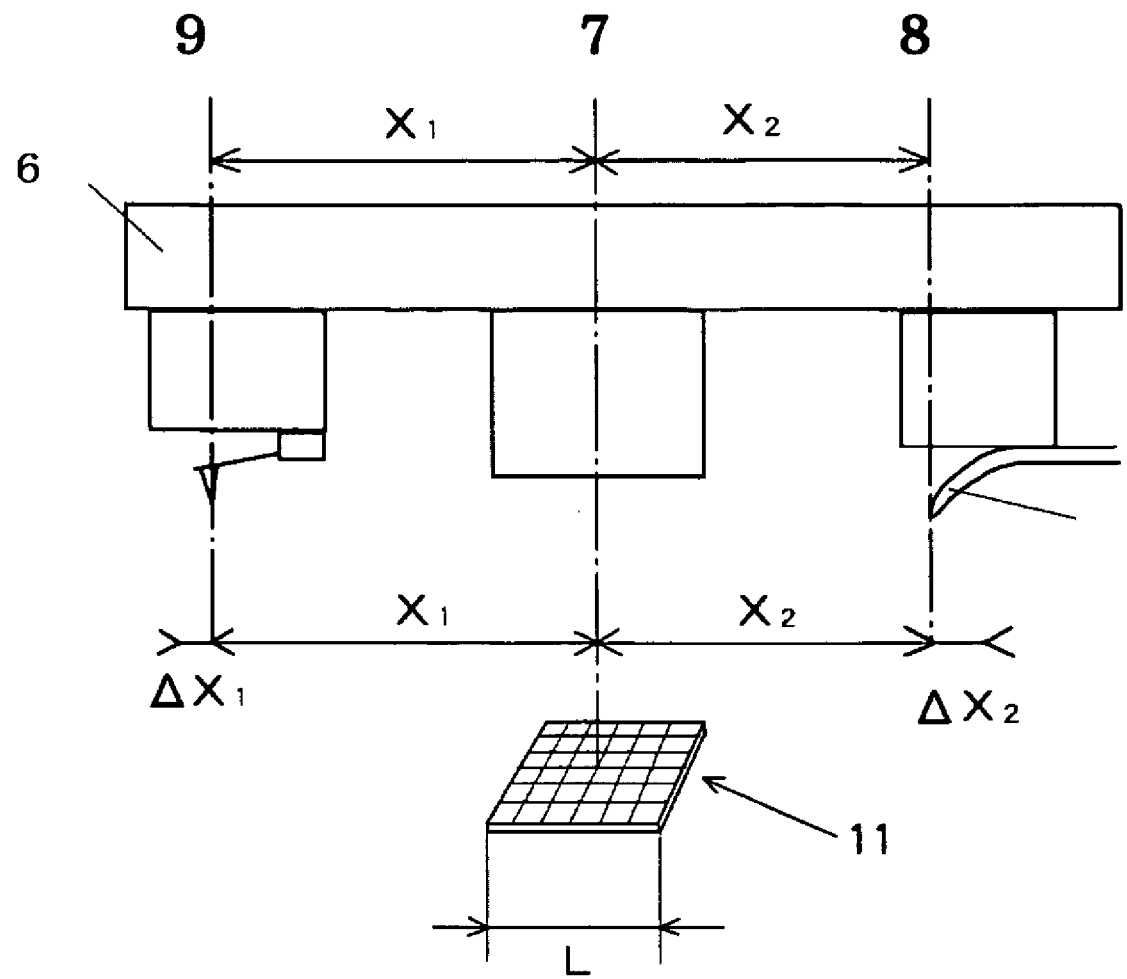
FIG. 2 is a view for explaining positioning of a mechanism of switching to a different kind of a microscope in the microscope system according to the invention.

In view of the fact that in the DNA sequencer of the background art, information of a single piece chain DNA is provided by an enormously troublesome operation of cutting two piece of chains of DNA constituting a chromosome into small segments, reading information of cut individual DNA, ascribing DNA which has been continuous in the original single piece of chain from end portion information, and resynthesizing the cut small segments, as described above, the inventors have started to carry out a research of providing an inspecting method capable of successively measuring DNA basically from an end to an end thereof without cutting DNA into small pieces thereof and apparatus capable of executing the inspecting method. The inventors have carried out researches of fixing a single piece of long DNA on a board as linearly as possible as a pretreatment therefor.

Now, in view of establishing a prospect of providing a sample of a single piece of DNA elongated in one direction on a board, the invention provides an apparatus of executing to test and inspect a total of DNA constituting a sample thereof. According to basic thought of the invention, by bringing a probe tip portion into direct contact with or making the probe tip end portion proximate to DNA which is a long cord-like body having a small width, various kinds of physical property information of DNA are detected and visualized by using a probe microscope function.

First, a sample board used in the invention will be explained. As a condition requested as a board, or a material of a board having excellent flatness and excellent adherence of DNA and elongated straight, there is used a cleavage face of glass, silicon wafer, gold (single crystal), mica, or HOPG (highly oriented graphite). As a surface treatment of a board, there is carried out chemical modification using silane coupling agent, thiol (mercaptan), disulphide (disulphide) or the like, and the surface treatment is for adhering DNA onto a board. A reagent for introducing positive charge to a surface is used by utilizing the fact that DNA is charged negatively.

Next, with regard to fabrication of a DNA sample, first, an explanation will be given of forming a sample in which RNA of gene information to which attention is paid is hybridized with a single piece of chain DNA. A single piece (two pieces of chains DNA) is taken out by disentangling DNA from a chromosome. When a temperature of two pieces of chains DNA is elevated in an aqueous solution, the two pieces of chains are melted to constitute a single piece chain DNA. Under the state, when an RNA probe (generally, DNA or PNA (polypeptide)) for bringing about hybridization is introduced to a specific portion, there is brought about so-to-speak hybridization in which the introduced RNA is adhered to a relative aligning portion of single piece chain DNA. The single piece chain DNA hybridized with the RNA is picked up as a sample, and DNA is labeled with a fluorescent member or gold colloid as an identification thereof. Under the state, DNA is fixed onto the board, and it is preferable for facilitating inspection thereafter to fix the long single piece of DNA as linear as possible. Although according to a fixing method of a related art, there is utilized a phenomenon of radially elongating DNA by operation of surface tension in shrinking a boundary surface of a liquid drop (aqueous solution drop) at a surface of a board in evaporating the liquid drop, the elongating method is not suitable for a mode of elongating long DNA to fix requested by the invention. In various trials, the inventors have been able to acquire knowledge that when the board is sunk and thereafter pulled up by traversing a gas/liquid interface of the aqueous solution of DNA, DNA is elongated by the surface tension of water. A single piece of long elongated DNA is fixed onto the board by the method.

A basic constitution of the invention is shown in FIGS. 1A and 1B, FIG. 1A is a perspective view and FIG. 1B is a plane view. Numeral 1 designates a level block constituting a base of an apparatus attached with legs 2 at four corners thereof and preferably provided with a horizontal adjusting mechanism and a vibration isolating mechanism. The level block 1 is attached with a sample stage 4 mounted with a sample base 3 and having a function of moving in two-dimensional XY directions, and an arm 5 in a channel-like shape so as to ride over the sample base 3. The arm 5 is slidably attached with a head switching mechanism 6 and the head switching mechanism 6 is attached with, for example, a fluorescence microscope (FOM) 7, a scanning near field microscope (SNOM) 8, and a scanning probe microscope (SPM) 9 to constitute a detecting system of the apparatus. Although in the illustrated example, the arm 5 is arranged to be orthogonal to a longitudinal direction of the sample stage 4, FOM 7, SNOM 8, SPM 9 are slid in the direction to be switched to an observing position, in sum, there may be constituted an arrangement structure in which the microscope to be switched can be caught centering on the same position on the sample base 3. Therefore, it is not indispensable to arrange the arm 5 to be orthogonal to the longitudinal direction of the sample stage 4, the arm 5 may be arranged in a direction intersecting therewith, or there may be constituted a rotationally sliding mode of a revolver type instead of the mode of the channel-like shape. Further, the arm 5 is attached with a skewedly incident laser mechanism 10 at a position on a side opposed to a side of attaching the microscopes.

FOM 7 and SNOM 8 are integrated to the apparatus as auxiliary observing means for SPM 9 which is final DNA detecting means. The three microscopes can be moved to positions capable of observing the same portion of the sample by respectively sliding the switching mechanism 6. However, the sample of the apparatus is a small structure of nanometer order of DNA and therefore, it is difficult to realize complete position matching in view of a mechanical structure. hence, according to the invention, a standard pattern sample 11 (for example, a pattern such as a lattice pattern) as shown by FIG. 2 is used, images by FOM 7 and SNOM 8 and SPM 9 are acquired and shifts of center positions in the images are measured. For example, when a position of arranging SPM 9 is designated by notation x1 and a position of arranging SNOM 8 is designated by notation x2 in view of design relative to an optical axis of the optical microscope FOM 7 arranged at a center, when actually switched by the head switching mechanism 6, shifts Δx1 and Δx2 are produced at center positions thereof in accordance with an attachment error or the like, and amounts of the shifts are determined by the standard pattern sample 11 and a microscope distance measuring function. The amounts of the shifts are stored as data at a storing portion of a control portion (computer), and when the switching operation is carried out, positions are corrected by the amounts of the shifts by controlling the XY two-dimensional moving mechanism of the sample stage 4. By the mechanism, the apparatus of the invention can function such that the center of the images of the microscopes to be switched always coincide with each other.

Next, the sample base will be explained. In testing, the sample is requested to be brought into a constant and stable state without a temperature distribution and therefore, it is important to control a total of the sample base to a predetermined temperature. As types of the sample base, there are sample bases in which the sample bases are used in the atmosphere and in a liquid, respectives of which are constituted by a reflection type and a transmission type.

First, a sample base used in the atmosphere will be explained. The sample 3 is constituted by a base main body and a holder, for which a material having a low linear expansion coefficient of invar, low expansion glass or the like is used. As shown by FIG. 3A, there is used a base main body of the transmission type having a rectangular shape frame member 3a a center portion of which is hollowed to be able to observe from below and a holder 3b a center portion of which is hollowed to be able to observe from below and the sample board is fixed to the hollow portion of the rectangular frame member 3a by pertinent means of fitting thereto or the like. The transmission type is used generally for irradiating light from below and observing a transmitted image. It is preferable that the sample is not expanded by temperatures and materials of expansion coefficients which are not only low but are not different from each other are used for the board and the sample base. Further, in the case of the reflection type, as shown by FIG. 3B, a base main body 3a' in a shape of a flat plate is used and although the holder 3b does not need to be hollowed, the holder 3b may be the same as that of the transmission type. It is sufficient to prepare only the base main bodies for the transmission type and the reflection type and the holder may be used for both of them without a problem. The base member and the holder of materials having a low linear expansion coefficient of invar, low expansion glass or the like are used. The sample board is fixed thereto by pertinent means of pasting a rear face thereof.

The base member 3a of the transmission type and the base member 3a' of the reflection type are held by the holder 3b a section in the longitudinal direction of which is constituted by a channel-like shape. As illustrated in a partially enlarged plane view of FIG. 3C, one end of the base main body 3a (3a') is brought into contact with one end portion of the holder 3b and other end thereof is pressed to be held by a holding plate 3d via a spring 3c fixed to one end portion of the holder 3b. As a material of the holding plate 3d, a material in which a linear expansion coefficient is low and is not different from the expansion coefficient of the sample board similar to the sample base 3 is used. A displacement of the other end side is produced by linear expansion accompanied by a variation in temperature and therefore, temperature stability of the sample base 3 is monitored by arranging a displacement sensor 12 of a capacitance sensor or the like at the portion. Although the sample base, the base main body 3a (3a') and the holder 3b whose thermal expansion coefficients are small and are not different from each other are used, when a temperature distribution is produced, differences in the displacements are produced at the portion. When there is brought about a state in which elongation is stopped or the elongation becomes equal to or smaller than an allowable value by a value of the sensor, it is determined that the temperature is uniform and stabilized and measurement is started. Further, the elongation of the sample base over time can be monitored in measurement, and a detected value thereof is used for correcting measurement error by elongating the sample base. Further, an adjusting screw 12a shown in the drawing is for adjusting a position of installing the sensor and the sensor is adjusted to a position having the most excellent sensitivity.

Next, the sample base used in a liquid will be explained. The sample base 3 used in a liquid is constituted by a sample tank 3e and the holder 3b and there are the reflection type and the transmission type similar to the sample base used in the atmosphere. As a material of the sample base 3, a material having a low linear expansion coefficient such as invar, low expansion glass or the like is used similar to the above-described. As shown by FIG. 4A by a perspective view, there is used the sample tank 3e of the transmission type which is constituted by a mode of a rectangular vessel capable of storing a liquid whose bottom face is transparent to be able to observe from below and the sample tank 3d is held by the above-described perforated holder 3b. Also in the reflection type, there is used a sample tank 3e' which is constituted by a mode of a rectangular vessel capable of storing a liquid whose bottom face is opaque and the sample tank 3e' is similarly fixed to the holder 3b and the hollowed holder 3b may be used therefor. When the sample is put into the liquid, as shown by FIGS. 4B and 4C, a liquid face is covered by a thin plastic film F for preventing evaporation of the liquid, a hole is bored only at an upper portion of the DNA sample constituting an observing region and inspection is carried out by putting a detector of SPM 9 into the hole. There is used a detector 14 of an optical lever type for detecting a displacement of a cantilever 13 of a probe. A light conducting member 15 comprising a transparent body of glass or the like is immersed in the liquid and extends above and below the liquid face such that even when a height of the water level is changed by scanning the probe, detecting operation is not influenced to thereby ensure stable light paths of incident and reflected light. Further, the probe is provided with a wave damper 16 as in a prow of a ship such that even when a scanner of SPM 9 is scanned at high speed, the liquid (liquid surface) does not become disturbed and wavy.

In order to stabilize the temperature of the sample to a predetermined temperature in inspection, the holder 3b is provided with heating means (not illustrated) of a heater or the like and the temperature of the liquid is controlled by using the heating means.

Next, a positioning function of the invented apparatus will be explained. As described above, the apparatus of the invention is provided with an observing apparatus having a low resolution in order to position a probe to a desired portion of DNA prior to various kinds of measurement of DNA using SPM. That is, according to the example shown in FIGS. 1A and 1B, as an observation positioning apparatus, detecting portions of SNOM 8 and SPM 9 are attached to the switching mechanism 6 on the left and on the right of the center of the fluorescence microscope 7 to be able to observe the same portion of the DNA sample.

Figure 5:
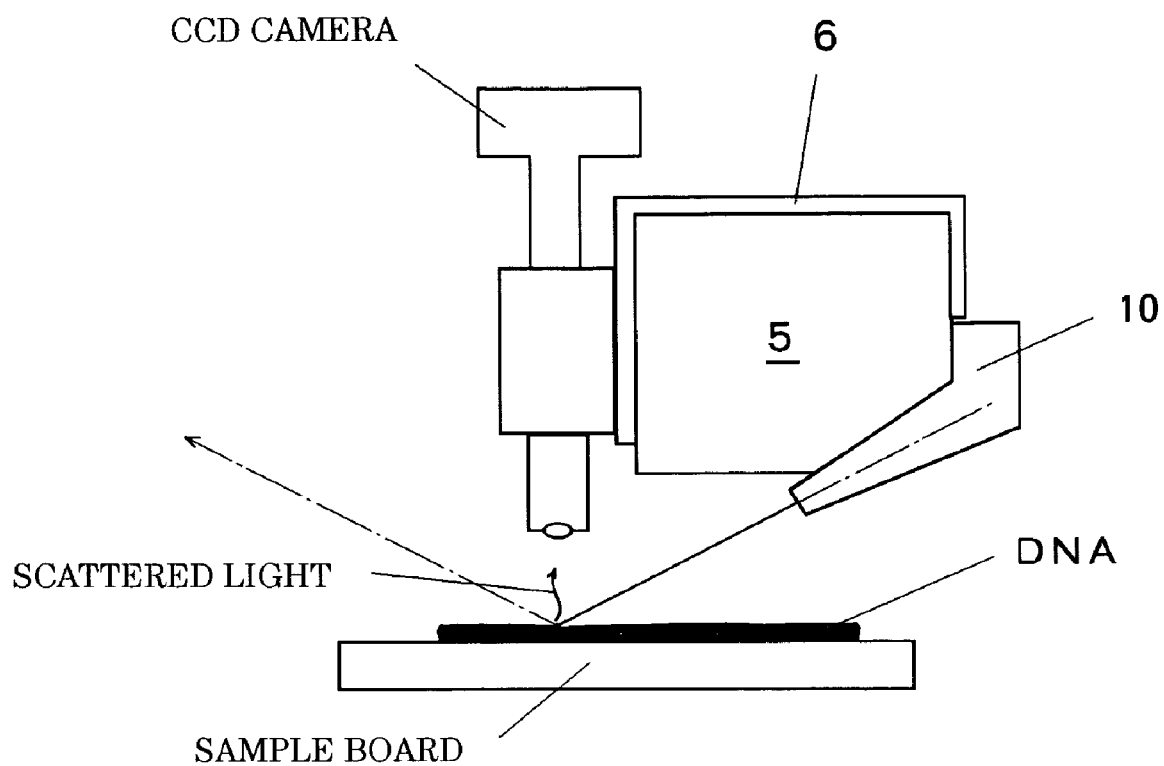
FIG. 5 is a view for explaining an example of using a dark field microscope in an apparatus according to the invention as an optical microscope.

First, as step 1, a desired portion of DNA is searched for by FOM 7. Now, assume that a sample is constituted by coupling an RNA probe to one piece chain of DNA by hybridization. The RNA probe is labeled by a fluorescent body and therefore, a location of the one piece chain of DNA coupled with the RNA probe is found by selective fluorescence observation. When the location is found, an XY two-dimensional moving mechanism of the sample stage 4 is operated such that the position comes to a center point of an observing region of FOM. When the position is made to be able to be positioned, as step 2, observation in a dark field laser scattering mode can also be carried out by interchanging lenses or attaching a high sensitivity CCD camera or the like. In that case, as shown by FIG. 5, observation of the dark field laser scattering mode is carried out by irradiating a laser beam from a skewedly incident laser mechanism 10 to grasp a position or the like of the single piece chain of DNA which is difficult to be dyed by fluorescence. The location of the one piece chain of DNA coupled with the RNA probe by hybridization is attached with a small particle of gold colloid or the like as a tag. The laser is skewedly irradiated to the small particle, scattered light from the small particle is converged by an object lens of the fluorescence microscope, and a spot position is confirmed by the high sensitivity CCD camera. When the confirmed position is deviated from the center position of the microscope observing region, the confirmed position is positioned by operating the XY two-dimensional moving mechanism of the sample stage 4. At this stage, the microscope is switched to SNOM 8 or SPM 9 by operating the head switching mechanism 6 and at that occasion, a positional shift accompanied by an attachment error of the microscope is automatically corrected by the above-described mechanism.

Step 3: the scanning near field microscope (SNOM) 8 is an apparatus of observing a portion to be observed identified by the fluorescence microscope 7 or the dark field laser scattering apparatus by a synthesized optical image by scanning an optical probe having a small opening area with a higher resolution and the resolution of the optical image is about 50 nm. Further, also a fluorescence image or the like can be measured. By SNOM 8 having a resolution higher than that of FOM 7, a specific portion of DNA to which a probe tip of SPM is carried can be positioned more accurately. The XY two-dimensional moving mechanism of the sample stage 4 is operated to position the specific portion to the center of an image observed by SNOM 8. At this stage, the microscope is switched to SPM 9 by operating the head switching mechanism 6.

At step 4, high resolution observation of DNA is carried out by SPM 9. The SPM stylus is positioned based on optical information provided by an observing apparatus for positioning with low resolution, shape, physical property information with high resolution is provided by SPM. There are SPMs for detecting various physical amounts and reading a base arrangement and according to the invention, general analysis of DNA can be carried out by providing detected amounts thereof. An outline of the detected amounts provided by the various inspection methods will be explained.

As information detected by SPM, there is pointed out measurement of the shape of DNA by a Topography image. According to the detection method, a base pair of 0.34 nm can be discriminated. However, there is a drawback of the detection method in which information of recesses and projections of the board overlaps information of the base pair.

The base pair of 0.34 nm can be discriminated also by measurement of DNA by a phase image. Although the detection method is difficult to be effected with influence of recesses and projections of the board, there is effected an influence by a difference in the hardness of the sample by hybridization.

A distribution of an adhering force of DNA is measured by measuring the adhering force of DNA by a PFM (Pulse Force Mode) image. PFM is a detection method constituting a detected amount by a position of cutting a water film produced between a sample face and a stylus tip portion by bringing a probe into contact with the sample face and pulling up the probe thereafter. There is a phenomenon of increasing the adhering force when DNA is hybridized and an adsorbing force of the hybridized portion is changed from that of a periphery thereof. Inspection by the detection method can be carried out by constituting the material of the probe by DNA, PNA (polypeptide), RNA or protein.

According to measurement of potential of DNA by KFM (Kelvin Probe Force Mode), there is observed a phenomenon in which when DNA is hybridized, minus charge thereof is increased more than at other locations thereof and therefore, the hybridized portion can be found by a potential image. According to the measurement by KFM, when an alternating voltage is applied between a sample constituting an object of measurement and a conductive cantilever stylus, by applying the alternating voltage, an electrostatic force is established between the conductive cantilever stylus and the sample and the electrostatic force is detected and visualized by mapping.

A hybridized portion of DNA can be detected by measurement of DNA by a chemical force microscope. PNA (polypeptide) is electrically neutral and therefore, at a portion attached with PNA, – charge of DNA is diluted. By searching for the portion by a stylus having + or – charge, the position can be found and the position is also determined as the portion attached with RNA or the like. For example, when chemically modified by thiol having amino group at a tip of a gold plated stylus, + distal end can be constituted and when chemically modified by thiol having carboxyl group or sulfone group, – distal end can be constituted. Further, in a neutral aqueous solution, an alumina stylus is charged to +, a silica stylus is charged to – and therefore, a portion can be selected without chemical modification.

A portion at which a mode of three pieces chains is constituted by adhering RNA to a location of constituting two pieces chains by hybridizing one piece chain DNA, negative charge is further increased and therefore, the portion can be detected by the inspection method.

When DNA is detected by a scanning tunnel microscope (STM), four kinds of base arrangements can directly be read. In the case of a metal board (gold), STM becomes high resolution observing means. However, a reading speed and an information amount need to be processed.

Next, a scanner of scanning a probe of SPM will be explained. The scanner is a finely moving actuator of a piezoelectric type applicable not only to a stylus of SPM but to a probe (optical fiber) of SNOM, mentioned above. A sample constituting an object of the invention is one piece of long DNA and therefore, although a scanning region of the probe is a narrow region in a width direction, the scanning region becomes a far wide region in scale thereof in a longitudinal direction. That is, assume that a scanning region of an X scanner is set to 50×1000 μm and a scanning region of a Y scanner is set to 1×20 μm to constitute scanning in a rectangular shape. A region of a Z scanner is constituted by two stages of a scanner for scanning to adjust an inclination of 1 through 5 μm and a high resolution scanner having a high resolution scanning region of 1 μm. A total of the scanner needs to be driven to scan in a liquid and therefore, the total of the scanner is constructed by a constitution of withstanding measurement in water by being coated by a waterproof coating.

In measurement, it is requested to adopt a soft scanning method such that DNA is impaired as less as possible. As a soft scanning method, according to the invention, an SIS mode is used. An SIS (Sampling Intelligent Scan) mode is a mode of measurement in which a sample is damaged inconsiderably and which is stably operated even when an adsorbing layer is present on a sample face. Specifically, a cantilever is vibrated by a small amount (amplitude equal to or smaller than 20 nm) at a vicinity of a resonance point and a total of the cantilever is moved up and down at each pixel (sampling point). When the cantilever becomes proximate to the sample face, the small amplitude is attenuated, when an attenuated amount reaches a predetermined amount, the cantilever is stopped to be proximate to the sample, and a value of Z at this occasion is recorded as a height of a surface of the sample. After measuring the height, the cantilever is pulled up and moved to a next pixel (sampling point) and similar operation is repeated.

The cantilever does not always knock the sample, the amplitude of vibration is small and therefore, the sample is damaged inconsiderably, further, even when the cantilever is trapped by the adsorbing layer, a total of the cantilever is pulled up and therefore, the measurement is stably operated without being interrupted.

In an apparatus of the invention for measuring information of DNA arrangement inscribed in a small region and a hybridized position, it is desired to realize high speed scanning for detecting an enormous amount of information. Hence, a high speed scanning method of the invention will be explained. Approach to an object body and a scanning method for efficiently measuring DNA elongated to be long on a board need to be devised and a number of specific examples will be shown as follows.

1. Assume a case in which a standard map of DNA constituting the object is known and it is detected at what position RNA to which attention is paid is hybridized, and whether the position differs from that of the standard map. First, a mark is optically confirmed and a surrounding of the mark is measured by successively increasing a resolution. At the hybridized portion, DNA becomes bold and therefore, a position thereof is searched for by measuring a shape by AFM or the like. Further, the mark and the surrounding of the mark are finely measured by various kinds of SPM. Further, it is measured how much is a length from a tip to the position.

2. Assume that the standard map of DNA constituting object is unknown and an inspection for forming a map is carried out. In this case, it is necessary to finely measure a single piece of long DNA from a tip thereof (one piece reading). Further, in detecting a hybridized portion at which the system becomes bold, base pairs are similarly read from a high resolution topography or a phase image.

First, the invention is significantly characterized in that in measuring DNA, one piece of long DNA is fixed on a board substantially linearly without dividing DNA in pieces as in the related art. However, it is insufficient for an image contour of SPM to scan one piece of long DNA from end to end in one motion. Therefore, there is adopted a method of scanning one screen with high resolution and scanning DNA by the stage by overlapping portions of images. In this case, with regard to breaks of images, a marker constituting a mark is measured on two screens of SPM and the images are overlapped. When frames are fed by scanning the sample stage 4, accuracy of the stage is important and one axis (X axis) is attached with laser interference or a linear scale. It is effective to use cantilevers formed in an array for high speed formation.

Although DNA on the sample base is fixed linearly, it is impossible to scan a probe on DNA completely by X scan. Scanning without omission of detection needs to realize by automatically tracking DNA in a nonlinear shape. FIGS. 6A and 6B show a first method of specifically realizing scanning of a probe in this way. As shown by FIG. 6A, a position of DNA is detected by executing short Y scanning having a width of $l_0$ in a direction of traversing long bent DNA. At next Y scanning advancing the detected position of DNA by one step x0 in X direction, scanning is executed by shifting a scanning region by changing positions of a start point and an end point to be disposed at a center of Y scanning of the width of $l_0$. The scanning region is shifted by changing the positions of the start point and end point to be disposed to the center in next Y scanning advancing a detecting position at this occasion by one step x0 in X direction. This is a method of scanning to firmly traverse long bent DNA by successively scanning DNA similarly thereafter. Although Y position thereof is changed considerably in an example illustrated in FIG. 6A since an explanation is given of an extremely bent sample, according to the invention, an object thereof is constituted by DNA fixed to the board substantially linearly and therefore, according to the scanning method, as shown by FIG. 6B, DNA can be caught substantially at a center of an image contour. Although an image of information of various physical properties starting from an image of a shape may directly be provided by scanning SPM by the scanning method, scanning can be carried out in two stages type of first, detecting the position of DNA by using SNOM or the like by the scanning method (search mode) and detecting information of DNA while controlling to scan an SPM probe based on the information of the position (detection mode). The former method is suitable for detecting the shape of DNA and the latter scanning method is suitable for detecting a base arrangement of DNA or detecting to provide a length dimension from a specific position of an end portion or the like. In detecting various physical properties by SPM, it is efficient to first detect the shape of DNA by the former scanning method and detect the base arrangement or the like by controlling to track the probe based on the accurate shape information.

Figure 7:
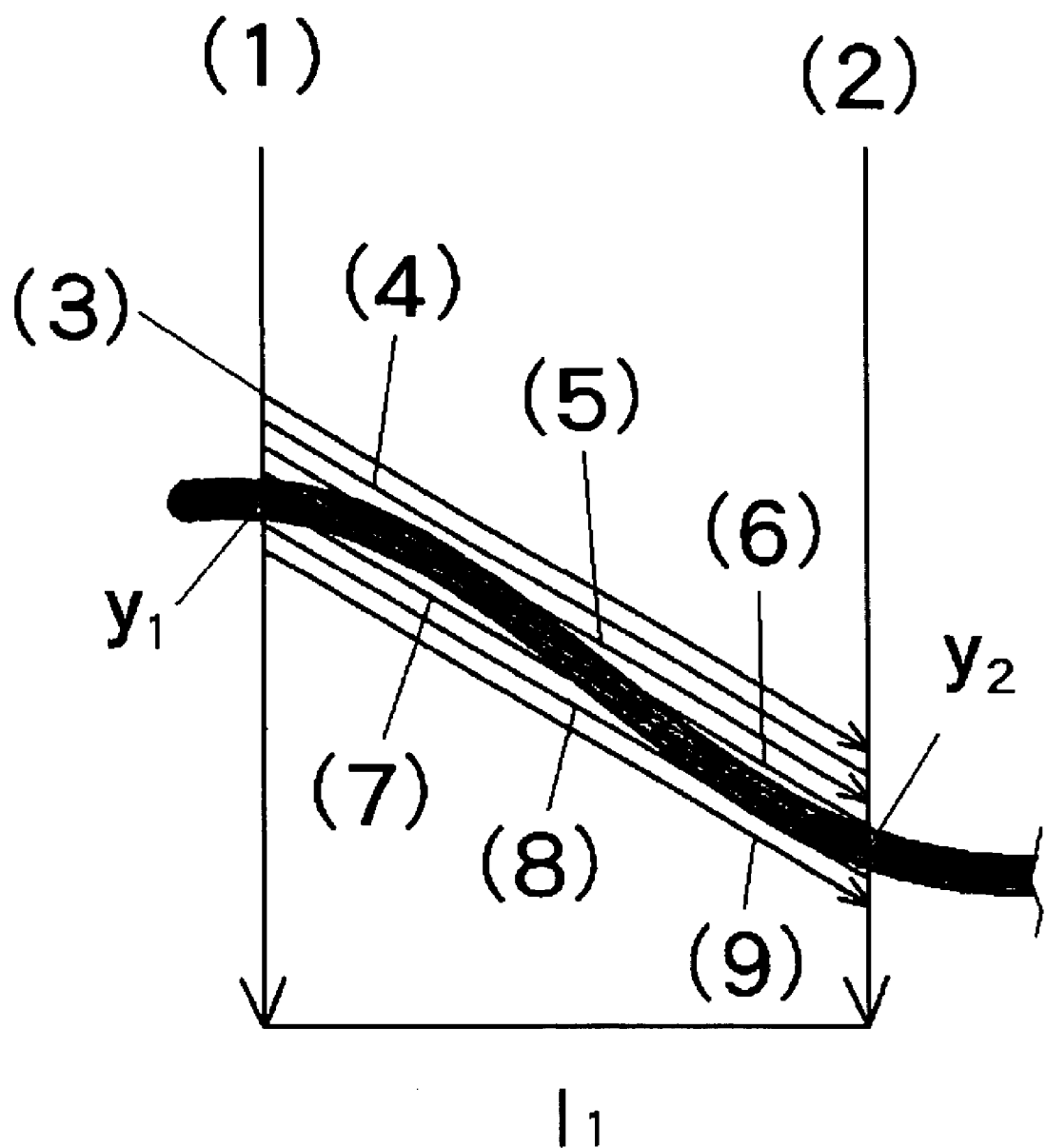
FIG. 7 is a view for explaining a second method of scanning a probe according to the invention.

According to a second scanning method, DNA is segmented for each unit length, first, a direction of DNA in a segmented region is determined and scanning of a plurality of lines in parallel with the direction is executed. As shown by FIG. 7, first Y scanning (1) is executed to traverse DNA at an interval of $l_1$ to detect a Y value at a position of DNA in an X position thereof. Next, second Y scanning (2) is executed at a position remote therefrom by $l_1$ in X direction to detect a Y value at a position of DNA in an X position thereof. A direction of DNA at the segmented region is determined from detected two position information y1, y2. The interval value $l_1$ is set as a value by which DNA can be regarded as substantially linear in the section. Although DNA is fixed to the board substantially in a linear mode, DNA naturally includes a bent portion which does not completely coincide with the detecting direction and therefore, a plurality of lines of scanning (3), (4) . . . in parallel with the detecting direction are executed in consideration of the width and the bent portion of DNA. The presence of DNA can completely be caught in an image region of SPM by the scanning method.

According to three scanning methods shown below, DNA is automatically tracked to scan by tracking systems. A third scanning method shown in FIG. 8A is a scanning method in which after detecting DNA, when the board is continued to detect by a predetermined length $l_0$, the board makes a U-turn to enter scanning of a next line. That is, after detecting DNA by executing Y scanning to traverse DNA, when the board is continued to detect by a predetermined amount of scanning, it is determined that the board traverses a portion of DNA to finish Y scanning, the board is advanced by one step $x_0$ in X direction and Y scanning is successively executed from a reverse direction. After detecting DNA similarly, when the board is continued to detect by the predetermined amount $l_0$, it is determined that the board traverses a portion of DNA to finish Y scanning, the board is advanced by one step $x_0$ in X direction and Y scanning is executed from a regular direction at this time. In sum, this is a method of automatically tracking DNA in a zigzag type by reversing scanning when DNA is detected. The scanning method is effective when the shape of DNA is measured and when the method is utilized in the form of a probe scanning control signal in detecting various physical properties by other probe thereafter.

A fourth scanning method shown below is a method of controlling a position of a stylus such that a height is always disposed at a highest position in comparison with that of a surrounding thereof and automatically scanning the stylus while connecting the highest positions. Also the method is provided with two stages of a search mode and a scanning mode. According to the scanning system, as shown by FIG. 8B, Y scanning is executed to traverse DNA at a certain point to find a highest point by measuring a shape thereof. Since the sample is DNA, the highest point, or the highest point of a traversing path is certainly disposed at a position of presence of DNA although the highest point may not be regarded as a center portion of DNA. The stylus is moved by a small amount of Δd from the highest point in a predetermined number of directions, for example, eight directions, and the stylus is moved by a predetermined amount d in a direction in which a change in the height is the least (inclination is the least). By executing Y line scanning centering on the point, the highest point of DNA is found. The stylus is moved by a small amount in a predetermined number of directions centering on the point again and the stylus is moved by the predetermined amount d in the direction in which a change in the height is the least. By repeating the movement, the stylus can be scanned always at a vicinity of the highest point of DNA. The above-described is a search mode and scanning in the detection mode is controlled by memorizing to store the position information of DNA. Further, it is not necessary that the predetermined number of directions are uniformly distributed in all the directions but it is efficient to reduce the number by limiting the directions in a predetermined angle centering on the detecting direction at a preceding time, or narrowing a width of the angle.

Figure 9:
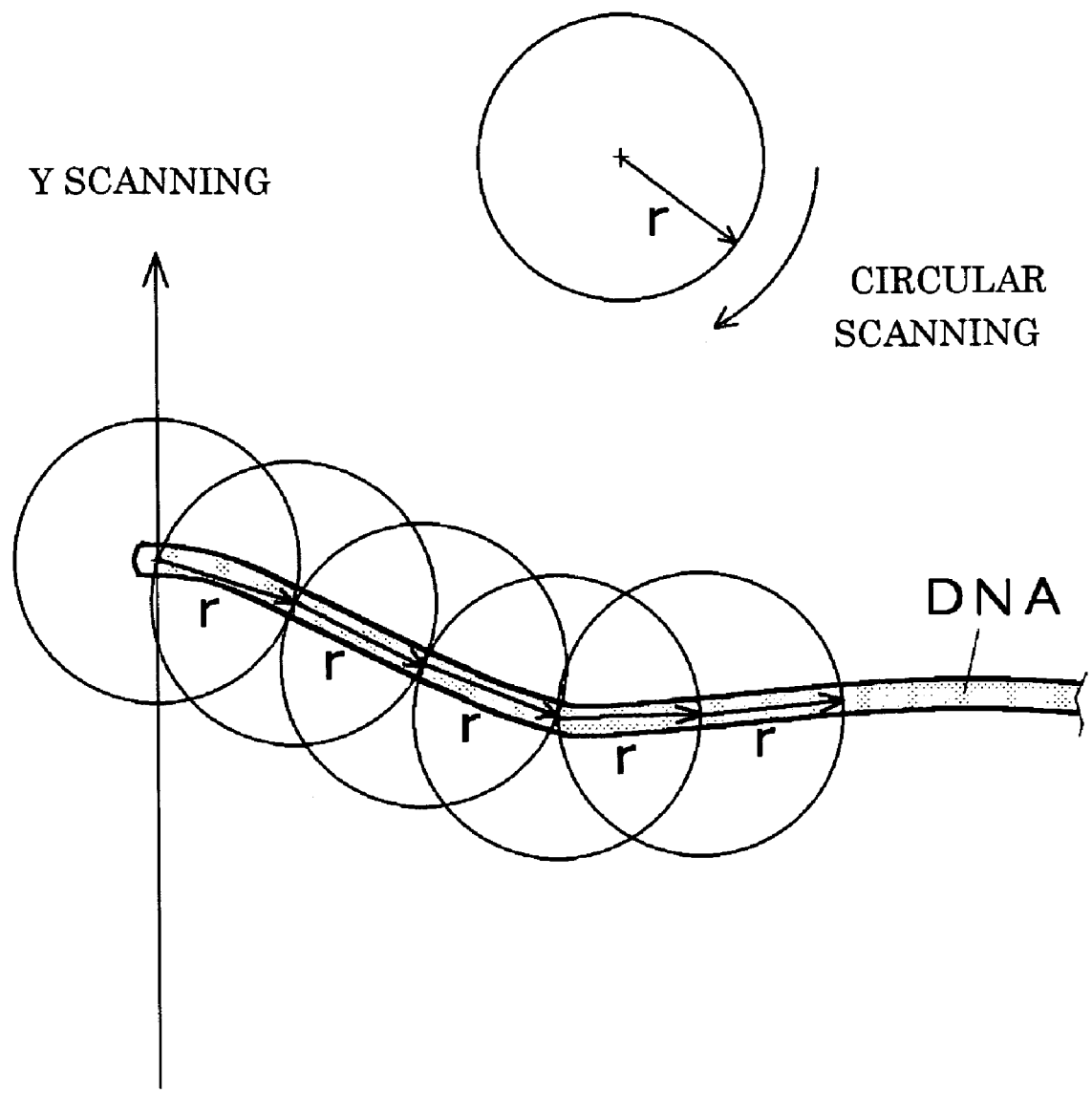
FIG. 9 is a view for explaining a fifth method of scanning a probe according to the invention.

Also a fifth scanning method is a complete tracking scanning system for controlling a position of a stylus such that a height of the stylus is disposed always at a highest position in comparison with that of a surrounding thereof, which is schematically shown in FIG. 9. Y scanning is executed at a certain point to traverse DNA to find a highest point at that occasion. Next, a probe is scanned to draw a circle of a radius of r centering on the highest point to detect a position and a direction of the highest point traversing DNA in the circular scanning. When a value of r by which DNA can be regarded as a linear line in correspondence with a linearity of the sample, DNA is present on a line connecting a center point and the highest point in the circular scanning. Hence, the probe is advanced in the direction. According to the scanning method, the position of DNA is grasped as information of a polygonal line having a dimension of r. The above-described is the search mode and scanning in the detection mode is controlled by memorizing to store information of the position of DNA.

A sixth scanning method is an application of a method referred to as a down-hill control in a general control technology. At a certain point, a Z value is detected by executing Y scanning to traverse DNA. Although the initial operation is similar to that in the previous method of finding a highest point, according to the scanning method, after detecting the highest point, when a decreasing tendency is sensed, Y scanning is reversed. Then, the stylus returns to the highest position and when the stylus traverses the point, the decreasing tendency is detected again. When Y scanning is reversed again at the time point, the operation returns to the initial operation and the operation is repeated thereafter. That is, although when the Y scanning is executed while staying at a certain X position, a vibration operation of reciprocating at the highest point is executed, when the vibrating operation is executed by adding a step of moving in X direction by a small amount, the stylus automatically tracks DNA while vibrating in Y direction on the highest portion of DNA. As a result, a position of DNA can be detected and grasped from a tracking locus of the stylus. The above-described constitutes a search mode and scanning in the detection mode may be controlled by memorizing to store the position information of DNA.

When an extremely slender sample such as DNA is measured, in an image of a microscope, a deformed image contour increasing a number of pixels in a longitudinal direction and reducing a number of lines in a short direction is formed and a scanning mode of SPM of the related art needs to be changed considerably. In such a deformed image contour, an inclination in the longitudinal direction poses a problem. An explanation will be given here of inclination correcting scanning of the invention.

When a sample having a height as low as 2 nm and a length over several tens cm such as DNA is measured, first, an inclination of a sample base is corrected and after correction, the sample is measured by a Z scanner having a narrow dynamic range, that is, having a high Z resolution. However, since correction by a mechanical method is limited and therefore, according to the invention, in order to correspond to the object, the sample base is provided with a piezoelectric element for correcting the inclination. Although the inclination can also be dealt with by using a Z direction piezoelectric element for measuring the sample, in order to measure the height of DNA with high resolution by promoting a dynamic range of the piezoelectric element for measuring the sample, the sample base is provided with the piezoelectric element for correcting the inclination. First, heights are measured along a contour of four sides of a measuring screen contour. At this occasion, a servo system of the Z direction piezoelectric element for measuring the sample is fixed and only the servo system of the piezoelectric element for correcting the inclination is made to be active. When the heights of the four sides are measured under the state and the inclination of the sample face is detected, a shift in the height by the inclination of the face at a measured position detected by operating the servo system of the piezoelectric element for correcting the inclination is corrected by the piezoelectric element for correcting the inclination. The inclination of the sample base is corrected by the operation, the height of the board at the measured position can be set to be disposed always at a center of the dynamic range of the piezoelectric element for measuring the height, the dynamic range of the piezoelectric element for measuring the sample can be promoted and the height of DNA can be measured with high resolution.

The apparatus of the invention constitutes an object thereof by a sample having a width or height dimension as small as about 2 nm and a length over several tens cm contrary thereto such as DNA and therefore, the probe cannot be scanned in the longitudinal direction in one motion. Therefore, according to the invention, as described above, there is adopted a method of dividing the longitudinal direction by a number of segments to acquire images and synthesizing the images. An explanation will be given here of synthesizing the images at that occasion. Assume that a contour of one sheet of an image of a microscope is, for example, about 1 μm×2 mm, and the images are successively measured by operation of shifting the images by an amount of one frame by the sample stage when one time measurement has been finished.

According to the DNA analysis of the related art, inspection is executed by dividing DNA per se to pieces, enormous labor and time is taken in synthesizing the pieces and the synthesizing is liable to be failed. The sample of the invention is not provided by dividing DNA but is acquired dividedly simply as an image of a microscope and therefore, the situation differs at all and the image synthesizing is simple and executed firmly as explained below.

In synthesizing segmented images according to the invention, a screen connection assisting software is used. That is, frames in X direction are fed by driving the sample stage and at that occasion, the frames of images between contiguous frames are fed such that end portions of images are necessarily overlapped. Therefore, overlapped portions are present at contiguous SPM images and therefore, the images are connected by simply processing to overlap the portions. The continuous region is constituted necessarily by the contiguous frame images and the images can be synthesized without fail even without a skill.

When a singular point is difficult to find in information of DNA per se and it is not easy to discriminate the overlapped portion, there can be adopted a method of generating a singular point (marker) by, for example, attaching a flaw to a board by a stylus or boring a hole by a laser marker at a side of DNA. Two images maybe connected together based on the singular point by constituting the singular point by the hole and scanning the images to overlap the singular point.

As a finer connecting method, there can be adopted a method of forming three points of the singular points at the vicinities of DNA and connecting together two images based on the singular points by scanning the images to overlap the singular points by constituting the singular points by the holes. In this case, also drifts of XY face and Z face by a time difference in measuring the two images can also be corrected.

Figure 10:
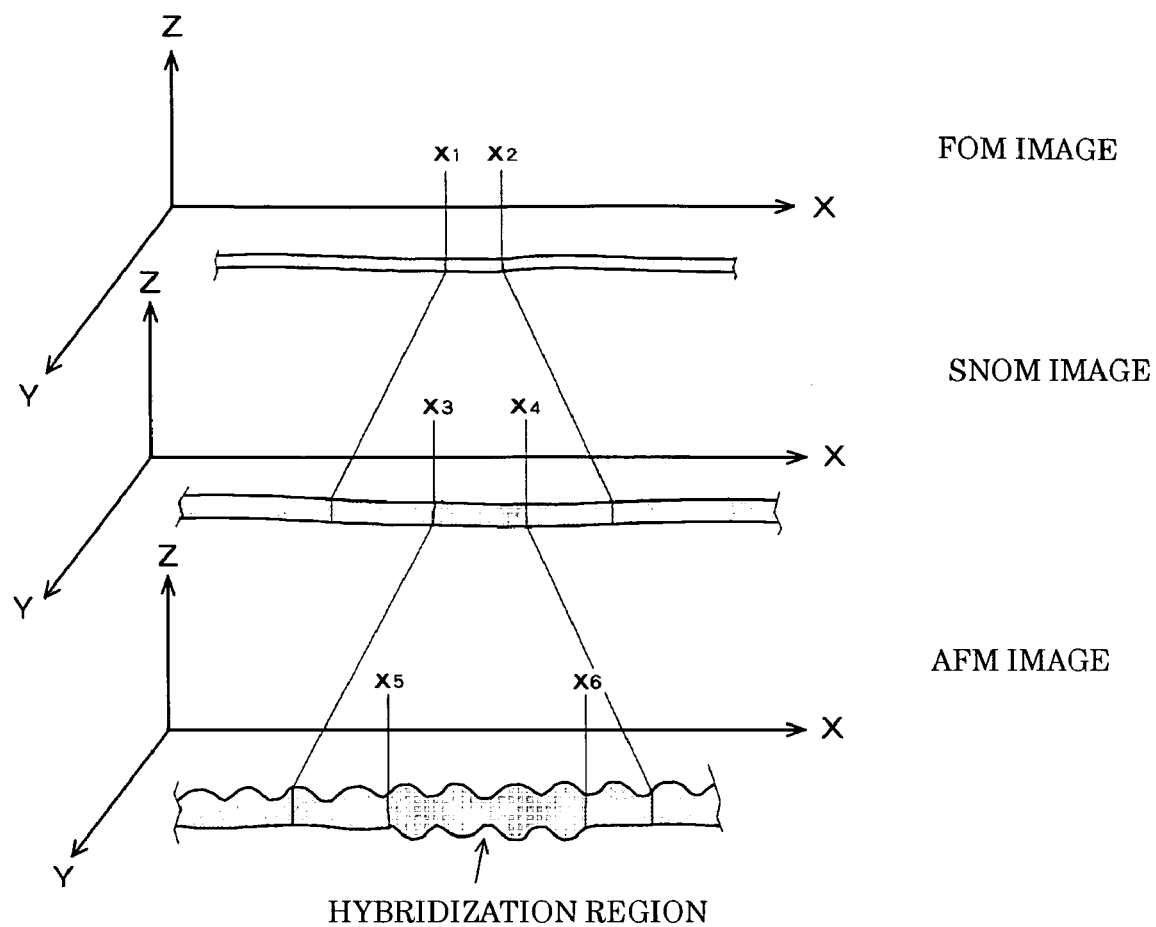
FIG. 10 is a view showing an example of aligning to display images by different kinds of microscopes in order to approach a predetermined location of DNA.

According to the apparatus of the invention, various data with regard to DNA can be acquired by using an optical microscope, SNOM and various SPM. An explanation will be given of a processing software capable of synthesizing and analyzing various data. As shown by FIG. 10, there are provided a software for aligning and comparatively displaying images of the same sample of DNA measured on the same stage by microscopes having different detecting functions and resolutions respectively by constituting a reference by coordinates of the stage, and a software for displaying a position specified in one image in other microscope image such that center positions thereof are positioned to coincide in X direction of a screen in comparative display and the positions are corresponded among the screens. In an example shown in FIG. 10, an access is facilitated to be made such that FOM→SNOM→SPM (multifunction) by a positioning software until measuring a predetermined location.

Figure 11:
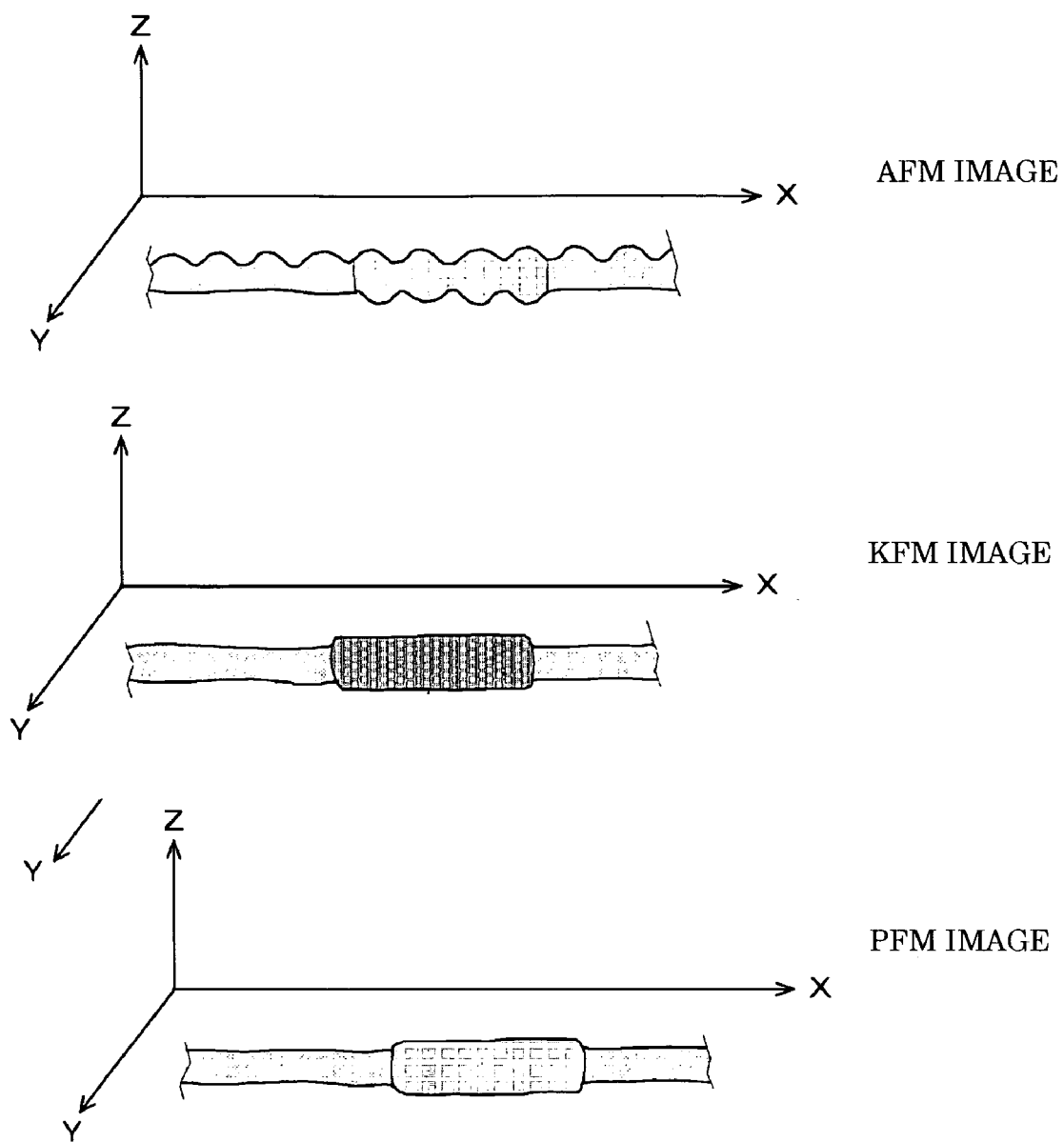
FIG. 11 shows an example of images comparatively displaying the same location of information detected by respective kinds of SPM by aligning the information on the same screen.

According to a display example shown in FIG. 11, information of the same portion detected by various SPM is aligned on the same screen to comparatively display. An upper stage screen shows a Topography image acquired by AFM and a portion hybridized with RNA becomes bold. A middle stage image is an image of the microscope by KFM (Kelvin prove Force Mode) and at a hybridized portion, an attraction force is intensified and therefore, the portion can be detected as the image different from that of one piece chain DNA or a board portion. A lower stage image is an image detected by PFM (Pulse Force Mode), at a hybridized portion, an adsorbing force is intensified and therefore, the image can be detected as the image different from that of one chain DNA or a board portion. An analysis can be deepened by comparing SPM images detected by different probes in this way or synthesizing information. Further, since the images are images of the same portion, the images may not be displayed in parallel but may be displayed to overlap completely.

The invention has been researched and developed by constituting a problem thereof by providing multifunction analyzing apparatus for detecting a shape with a high resolution and physical property information not only capable of successively reading a base arrangement from an end to an end but also capable of specifying a position of hybridizing known RNA with regard to a single piece of DNA sample elongated in one direction on the board as described above, the SPM apparatus according to the invention is not limited to be used to DNA but is widely applicable to observation of a sample having a long structure and a small section elongated on a board, for example, measurement of denaturing of protein, an arrangement of a molecule of one piece chain polymer, peptide or the like.

Further, as a method of making an access to a desired portion of a small structure by a probe of SPM, the method does not need to be limited to a combination of a fluorescence microscope, a scanning near field microscope, and a scanning probe microscope but may be a system having a microscope having a function of detecting a specific portion and a scanning probe microscope and capable of making an access easily to a position specified by the microscope having the function of specifying a specific portion by a probe of the probe microscope. When a direct access is difficult, there may be provided a microscope having a middle magnification for connecting a position specified by a fluorescence microscope having the function of detecting a specified portion to the probe microscope.

What is claimed is:

1. A microscope system comprising: a fluorescence microscope having a function of detecting a specified portion of a sample; a scanning probe microscope; a scanning near field microscope having a magnification between those of the fluorescence microscope and the scanning probe microscope; and a switching mechanism to which are fixed the microscopes, wherein the respective microscopes can be moved to a position at which the same portion of the sample can be observed by a switching operation of the switching mechanism.

2. A microscope system according to claim 1; wherein the scanning probe microscope is detachably fixed to the switching mechanism to enable the scanning probe microscope to be detached and interchanged with scanning probe microscopes having different functions so that the microscope system is capable of directly detecting the shape of the sample and a plurality of pieces of information of one or more physical properties of the sample.

3. A microscope system according to claim 1; further including a sample stage that supports the sample and that is movable in X and Y directions; and a standard pattern sample; wherein when the respective microscopes are moved by the switching mechanism to the position at which the same portion of the sample can be observed, the microscope system acquires an image from each microscope using the standard pattern sample, stores information of a positional shift from images of the respective microscopes and corrects an amount of the positional shift between the respective microscopes by moving the sample stage in the X and Y directions.

4. A microscope system comprising: an optical microscope having a function of detecting a specified portion of a sample; a scanning probe microscope; and a switching mechanism to which are fixed the microscopes, wherein the microscopes can each be moved to a position at which the same portion of the sample can be observed by a switching operation of the switching mechanism; and a sample tank containing liquid in which is immersed the sample and in which extends a probe of the scanning probe microscope; wherein the scanning probe microscope has attached thereto a transparent optical member that extends above and below a liquid face of the liquid in the sample tank, and a front portion of the probe is provided with a wave damper to prevent variations in the liquid face caused by scanning the probe at a high speed from affecting performance of the scanning probe microscope.

5. A microscope system according to claim 1; further including a sample tank containing liquid in which is immersed the sample and in which extends a probe of the scanning probe microscope; wherein the scanning probe microscope has attached thereto a transparent optical member that extends above and below a liquid face of the liquid in the sample tank, and a front portion of the probe is provided with a wave damper to prevent in the liquid face caused by scanning the probe at a high speed from affecting performance of the scanning probe microscope.

6. A microscope system comprising: an optical microscope having a function of detecting a specified portion of a sample; a scanning probe microscope; a switching mechanism to which are fixed the microscopes, wherein the microscopes can each be moved to a position at which the same portion of the sample can be observed by a switching operation of the switching mechanism and wherein the scanning probe microscope is detachably fixed to the switching mechanism to enable the scanning probe microscope to be detached and interchanged with scanning probe microscopes having different functions so that the microscope system is capable of directly detecting the shape of the sample and a plurality of pieces of information of one or more physical properties of the sample; and a sample tank containing liquid in which is immersed the sample and in which extends a probe of the scanning probe microscope; wherein the scanning probe microscope has attached thereto a transparent optical member that extends above and below a liquid face of the liquid in the sample tank, and a front portion of the probe is provided with a wave damper to prevent variations in the liquid face caused by scanning the probe at a high speed from affecting performance of the scanning probe microscope.

7. A microscope system according to claim 2; further including a sample tank containing liquid in which is immersed the sample and in which extends a probe of the scanning probe microscope; wherein the scanning probe microscope has attached thereto a transparent optical member that extends above and below a liquid face of the liquid in the sample tank, and a front portion of the probe is provided with a wave damper to prevent variations in the liquid face caused by scanning the probe at a high speed from affecting performance of the scanning probe microscope.

8. In combination: a sample; a first microscope capable of observing a desired portion of the sample; a scanning probe microscope capable of observing the desired portion of the sample at a higher resolution than the first microscope; a switching mechanism having the first microscope and the scanning probe microscope fixed thereto and being switchable to a first position to move the first microscope in position to observe a desired portion of the sample arid switchable to a second position to move the scanning probe microscope in position to observe the desired portion of the sample; and a sample tank containing liquid in which the sample is immersed and in which extends a probe of the scanning probe microscope, the probe having a wave damper that effectively prevents disturbances of the liquid surface created by scanning the probe in the liquid from affecting performance of the scanning probe microscope.

* * * * *